United States Patent
Loewenthal, Jr. et al.

[11] Patent Number: 5,979,724
[45] Date of Patent: Nov. 9, 1999

[54] AUTOMOBILE UNIVERSAL DASHBOARD MOUNTING APPARATUS

[75] Inventors: William J. Loewenthal, Jr., Redwood City; Robert B. Brownell, Santa Clara; Andrew L. Johnston, Redwood City, all of Calif.

[73] Assignee: Command Audio Corporation, Redwood City, Calif.

[21] Appl. No.: 09/145,483

[22] Filed: Sep. 1, 1998

[51] Int. Cl.⁶ ........................................................ B60R 7/06
[52] U.S. Cl. .......................... 224/483; 224/556; 224/560; 224/561; 224/553; 224/929; 224/926; 248/311.2; 248/224.51; 248/288.51; 248/231.81; 379/455
[58] Field of Search ..................................... 224/483, 539, 224/545, 548, 553, 555, 556, 560, 561, 926, 929, 550; 248/311.2, 224.51, 288.51, 231.81; 296/37.12; 379/446, 455

[56] References Cited

U.S. PATENT DOCUMENTS

| | | | |
|---|---|---|---|
| 4,066,231 | 1/1978 | Bahner et al. | 248/289.11 X |
| 4,617,430 | 10/1986 | Bryant | 224/483 X |
| 4,852,843 | 8/1989 | Chandler | 224/483 X |
| 5,086,958 | 2/1992 | Nagy | 248/224.51 X |
| 5,396,556 | 3/1995 | Chen | 379/446 |
| 5,489,055 | 2/1996 | Levy | 224/556 X |
| 5,593,124 | 1/1997 | Wang | 224/483 X |

*Primary Examiner*—Gregory M. Vidovich
*Attorney, Agent, or Firm*—Skjerven, Morrill, MacPherson, Franklin & Friel LLP; Norman R. Klivans

[57] ABSTRACT

A universal mounting apparatus to hold personal devices such as cellular telephones, walkie talkies, etc., by attaching onto a vehicle grill vent in the vehicle dashboard. This apparatus is not configured to any particular year or model of automobile or other vehicle, but is adaptable in several different ways so as to provide different attachment configurations. It is attachable without tools to most automobiles by use of two cable tie-like straps. One end of each strap hooks around a rib in the vent grill and the other end extends through a member which is held against a bracket, the feet of which bear against the dashboard immediately surrounding the vent grill. This allows the apparatus to conform to different sizes and shapes of vent grills while maintaining a firm connection.

11 Claims, 5 Drawing Sheets

15,979,724
1

AUTOMOBILE UNIVERSAL DASHBOARD MOUNTING APPARATUS

BACKGROUND

1. Field of the Invention

This invention relates to vehicular accessories and more specifically to an apparatus for holding small items such as a cellular telephone on the dashboard of an automobile or other vehicle.

2. Description of the Prior Art

A number of commercially available products mount to the dashboard of an automobile to hold small objects, such as a cellular telephone. Typically these products include a bracket having feet which fit against the dashboard of the automobile and are held to the dashboard. Attached to the bracket is for instance a ball of a ball and socket joint. The socket of the ball and socket joint is attached thereto. A holster, or other type of container, is attached to the socket for holding for instance the cellular telephone. One such product is a relatively simple bracket whose feet fit into the seams in the dashboard. This has the advantage of requiring no fasteners, but the disadvantage that since it fits in the dashboard seams, a different bracket is required for each model of car, there being no standard distance between dashboard seams. Other types of fasteners actually fasten into the dashboard for instance by screws, etc.

A number of such devices attach to the ventilation ("vent") grills typically mounted in the dashboard. These grills provide a number of vent ribs to which devices can be relatively easily clamped or mounted. Hence this is a ready made mounting area. In one such device, hooks are provided which hook around the vent ribs and a corresponding screw mechanism draws the hooks against the vent ribs. This has several disadvantages. For one thing, there is no assurance that the screw end will actually clear the ribs; also the device may not fit all vehicles. Another type of device includes metal clips which clamp onto the vent ribs and stabilizer legs which bear on the dashboard surrounding the ventilation grill. This device, however, is not rigidly mounted. It has the advantage of being extremely adjustable, but may come loose under severe vibration. Another device is a vent hanging bracket which includes hooks which catch on the vent ribs and a metal clip which presses against the vent, creating a snug fit. Corresponding posts mount on the dashboard. This is self adjusting and compliant, but provides no width adjustment.

Therefore, while this is a well-known problem, currently available solutions all have significant defects.

SUMMARY

In accordance with this invention, a vehicle universal mounting apparatus mounts to the grill vent ribs and to the surrounding dashboard. In one embodiment the apparatus includes a bracket member having two feet, the ends of which are typically padded. The feet bear against the dashboard immediately surrounding the vent grill on two opposing sides of the vent grill. A second smaller member fits onto the surface of the first bracket member opposing the side of the bracket member facing the dashboard. A cavity or indentation is provided in the first member to accommodate this second member. The second member carries on its exterior surface one element of a ball and socket joint. The corresponding element of the ball and socket joint is attached to a holster, for instance for a cellular telephone or other device.

The second smaller member is held to the first bracket member by two parallel extending flexible straps. These straps each terminate (on the dashboard side) in a hook which fits around one of the vent ribs. Typically the two hooks fit around two different vent ribs. The straps therefore extend through the bracket member and through associated slots formed in the second smaller member. The straps are adjustably held in the slots, for instance by spring clamps formed on the second member adjacent each slot. Typically these clamps bear upon teeth or indentations formed in the straps, and thereby each strap is independently adjustable in its slot.

This allows tensioning of the apparatus to firmly hold the bracket member against the dashboard. In one embodiment, the ends of the bracket member which bear against the dashboard are soft (padded) and a set of modular adjustment blocks provided to allow variation of the length of each bracket member leg to accommodate different cars.

In one embodiment the bracket member is also adjustable in terms of length so as to accommodate different size vent grills. The second member in one embodiment includes a number of lugs which fit within corresponding detents within the cavity defined in the bracket member. This allows adjustment of the position of the second member within the bracket member if desired. In one embodiment, the second member alternatively does not fit within the cavity in the bracket member, but instead sits across the bracket member with slots formed in the second member fitting onto ribs on the outer surface of the bracket member.

DETAILED DESCRIPTION

Figure 1:
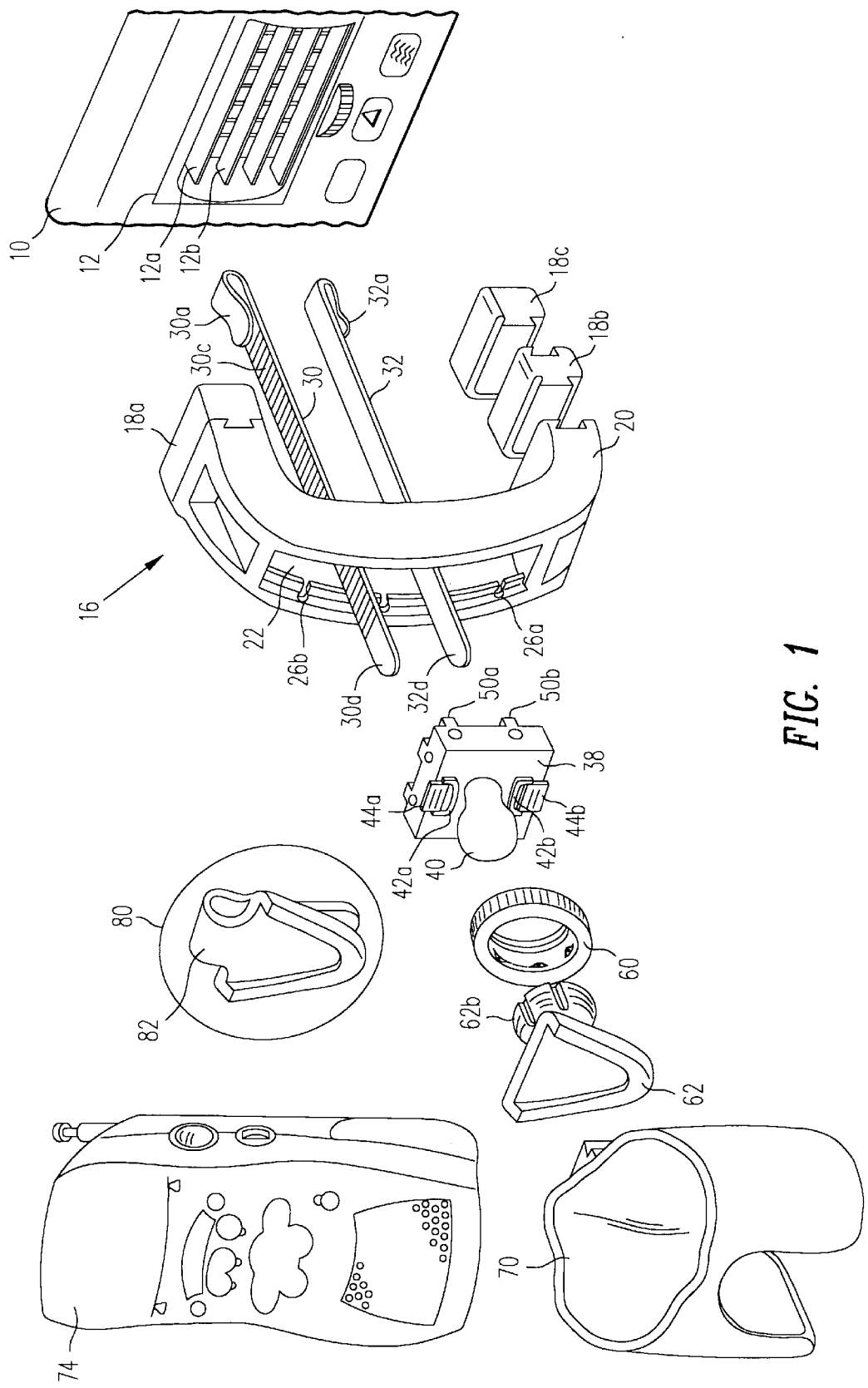
FIG. 1 shows a disassembled view of a mounting apparatus in accordance with this invention.

FIG. 1 shows a disassembled view of an apparatus in accordance with this invention. Certain elements depicted in this figure are conventional but are intended for use with the invention, as understood from the following description.

In FIG. 1, part of the dashboard 10 of an automobile is depicted. (Only a small portion of the dashboard 10 is depicted.) This is entirely conventional and includes a vent grill 12 with several vent ribs 12a, 12b, etc. This is all part of the automobile, with which the pertinent features of the invention cooperate, and is shown merely for purposes of illustration.

An apparatus in accordance with the invention is shown in the central portion of FIG. 1 and includes a first bracket member 16 which is approximately a squared-off C-shape. (This shape is not limiting and is merely illustrative.) Bracket member 16 includes at its legs two padded feet 18a and 18b; for purposes of accommodating a slanted dashboard, the feet may be modularized so, as shown in this case, an additional foot 18c is provided which attaches to foot 18b and therefore provides in effect adjustable lengths of the legs of bracket member 16. Of course, this modularization is not necessary.

In this embodiment, the padded feet 18a, 18b, are configured so as to fit into corresponding dovetail slots in member 16. Again, this attachment method is not limiting and of course there is no requirement that the feet be modularized as shown or that they be padded. If the bracket member 16 itself is of reasonably soft material, there is no need to provide padded feet. The bracket member 16 includes a main body portion 20 which defines at least one opening 22; the actual size of this opening is not critical.

Extending through opening 22 are two flexible tie straps 30 and 32, for instance of flexible plastic. While not standard parts, their fabrication is readily understood by one of ordinary skill in the art. The remaining components in FIG. 1 also are not necessarily standard, but are typically formed of plastic, etc. by conventional methods. Each tie strap 30, 32 includes at (its right hand end) a hook respectively 30a, 32a. These hooks 30a, 32a are configured so as to slide around one of the corresponding vent ribs 12a, 12b and thus secure to the vent rib. Thus the actual size of the hooks and their openings are such as to fit around a typical automobile vent rib. Since the hooks themselves are made of the same flexible material as the remainder of the tie strap (for instance plastic but perhaps metal or other materials) the exact size of these hooks is not critical. Note in this embodiment the two hooks 30a and 32a are back to back (opposing). That is, the hooks are facing outwards. This has been found to provide better fastening to the vent ribs, but is not required.

Each of the tie straps 30, 32 includes along its length a number of parallel extending teeth-like structures 30c (which are only visible on tie strap 30 in FIG. 1). These are teeth (or indentations) or similar structures to provide the adjustability, as described below, for the length of the straps.

The far ends 30d and 32d of each of the tie straps extend through cavity 22 and through respective slots defined in the second (ball joint) member 38. Member 38 includes on its outer side a ball 40 of a ball and socket joint. (Alternatively, the socket of the ball and socket joint is attached to member 38). Member 38 also includes respective slots 42a and 42b for accommodating the ends 30d and 32d of the two straps. That is, each of the straps extends through one of these slots from the back (not visible) surface of member 38 to the viewed surface of member 38. The straps are adjustable and their respective slots 42a, 42b have associated spring loaded clamps respectively 44a and 44b which bear upon the teeth 30c on each strap. This provides adjustability in terms of the length of the straps which extend through the member 38.

Also, cavity 22 in bracket member 16 includes a number of detents (notches) 26a, 26b, etc. which mate with corresponding lugs 50a, 50b on member 38. Member 38 can be located in any one of a number of positions within cavity 22 with the lugs 50a, 50b mating with the corresponding detents 26a, 26b. Thus, it can be seen that given the orientation in FIG. 1, the member 38 can be located at the top, middle or bottom of cavity 22. This provides additional adjustability but is not required.

Thus this apparatus is adjustable in multiple degrees of freedom. First, the hooks 30a, 32b can fit over any one of the vent ribs. Next, the feet 18a, 18b, 18c, by their presence or absence, provide different amounts of "standoff" from the dashboard and also allow adjustment for a slanting dashboard by providing different numbers of feet on the two ends of the bracket 20. The straps 30, 32 are flexible and hence allow for some adjustment in that sense. Moreover, the strap lengths are adjustable over most of their length (due to their teeth) and hence this provides not only a length adjustability, but also the desired degree of tension in terms of drawing member 38 against member 20 by the straps. Also, the position of member 38 within its cavity 22 is variable.

The remaining structures in FIG. 1 are readily understood. Lock ring 60 fits around the ball 62b which extends from a ball joint cup 62. Thus when assembled, ball joint cup 62 fits tightly around ball 40. Holster 70 has an extension (not visible) that fits within the bayonet mount of cup 62. The holster 70, for instance, is used to hold a cellular telephone, walkie talkie, soft drink can, other electronic devices or in one embodiment, the device 74 which is intended to depict a communications type device including a specialized radio receiver for purposes of information transfer. However, for purpose of the invention the nature of device 74 is not pertinent. In one embodiment, an optional belt clip 82 is provided (shown within detail 80). Clip 82 fastens into the bayonet mount on holster 70 when one wants to remove the holster 70 from the vehicle.

Figure 2A:
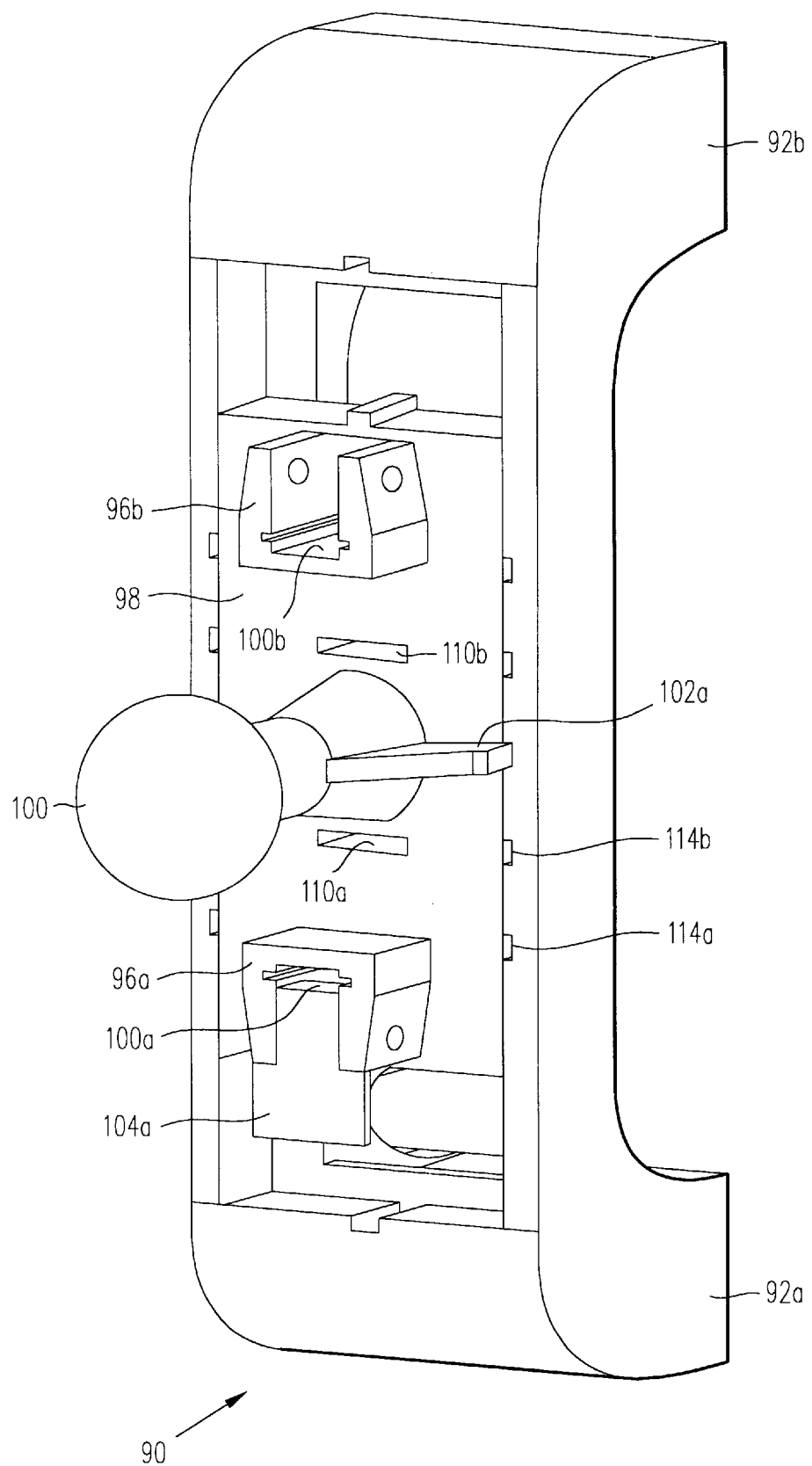
FIG. 2A shows an assembled view of relevant portions of a second embodiment of the mounting apparatus.

Another embodiment, in most respects similar to that of FIG. 1, is shown assembled in FIG. 2A. Here the bracket member 90 has a slightly different shape to illustrate one possible variation in same. This bracket member 90 terminates in feet 92a and 92b. (For simplicity, the vehicle dashboard and the tie straps and a number of other elements of FIG. 1 are not depicted here.) In this case, the second member 98 is relatively long (unlike the corresponding square shaped member 38 in FIG. 1). In FIG. 2A, the details of the tie strap slots and the corresponding clamps are better shown. In this case, the two slots 100a, 100b accommodate the tie straps (not shown). Slots 100a and 100b are surrounded by structures 96a and 96b which are the spring clamps. One of the spring clamp members (buttons) 104a is shown for simplicity; the other is absent to better illustrate the internal structure.

The spring clamp member 104a is biased towards the associated tie strap by a torsion spring. A tooth on member 104a engages the corresponding teeth on the tie strap, allowing one-way slippage past the member 104a, but preventing release of the tie strap. Depressing member 104a however, disengages the teeth, allowing the tie strap to be repositioned or removed from the slot. This mechanism provides the ratcheting action of the tie straps so that in installation, the apparatus may be cinched against the dashboard by simultaneously pulling on the tie straps and pushing on the remainder of the assembly.

Figure 2B:
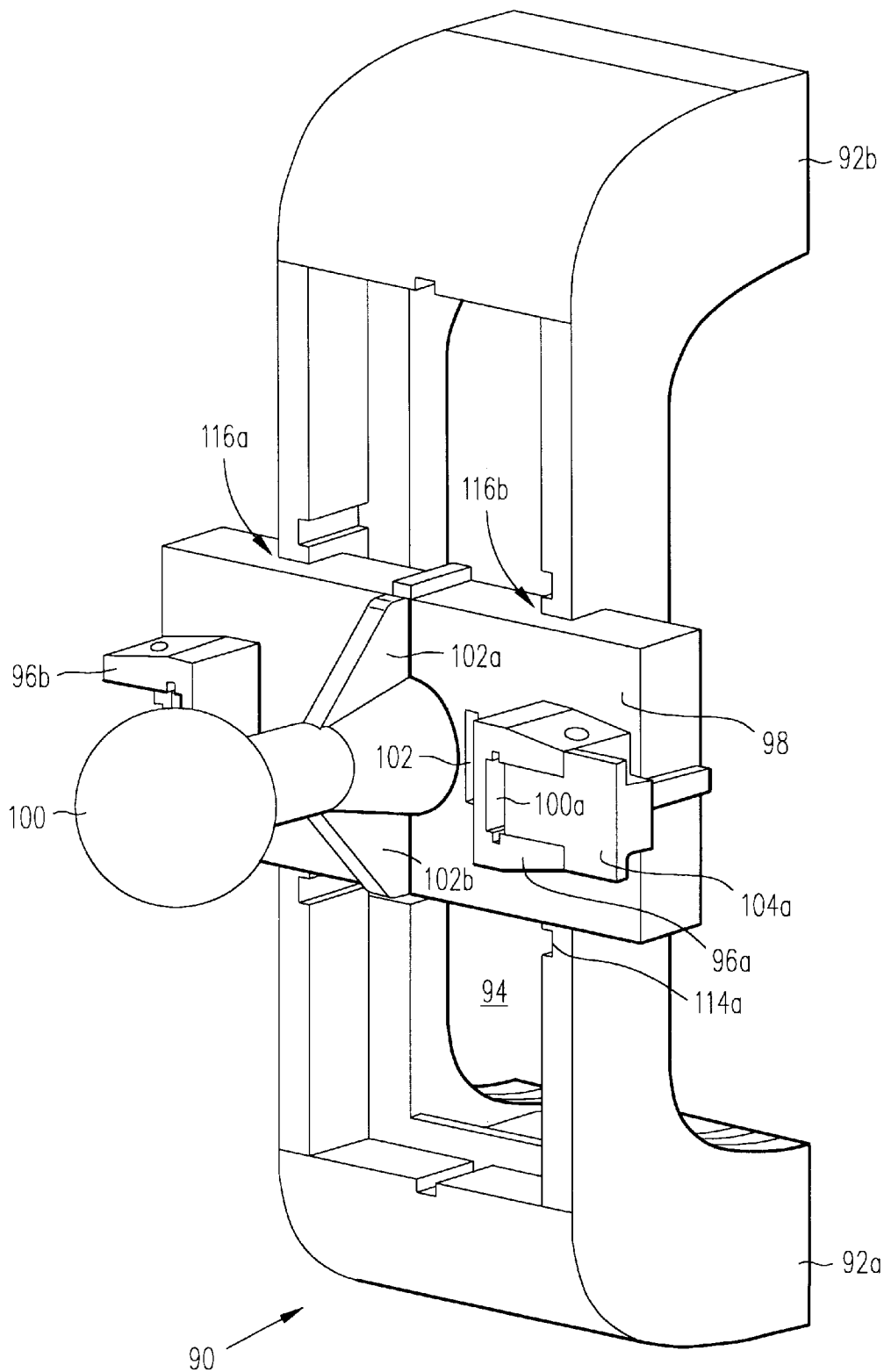
FIG. 2B shows the apparatus of FIG. 2A with the second member rotated 90°.

Mounted on the second member 98 is the ball 100, in this case supported by conventional molded plastic ribs 102a, 102b (see corresponding FIG. 2B). One structure shown in FIG. 2A and not in FIG. 1 is a second set of slots 110a, 110b in member 98 which accommodate the loose ends 30d, 32d of the tie straps. That is, when the tie straps extend through the slots 100a, 100b their far ends are then tucked back into slots 110a, 110b, so that they are out of the way. Alternately, of course, these ends are cut off.

Also, invisible in FIG. 2A are detents 114a, 114b, etc. formed in the cavity 94. These correspond to detents 26a, 26b in FIG. 1.

FIG. 2B depicts essentially the same structure as FIG. 2A, but with the second member 98 rotated 90°. This second configuration of the apparatus, which uses the exact same parts as shown in FIG. 2A but in a different configuration, allows some variation in the mounting of bracket 98. In this case bracket 98 does not fit within cavity 94, but instead sits astride bracket member 90 as shown. In this case, slots 116a, 116b defined in the underside of member 98 straddle the vertical ribs which form the sides of bracket 90. The advantage of the FIG. 2B configuration is that certain automobiles have vents whose ribs are oriented vertically (as opposed to the standard horizontally oriented ribs), requiring that the tie straps be oriented similarly. Additionally, the dimensions of vent openings may be such that one orientation of the assembly is able to span the vent, while another falls short. It is thus advantageous for the tie strap orientation to be independent of the leg orientation, so that in such a case either vent rib orientation may be accommodated.

Figure 3A:
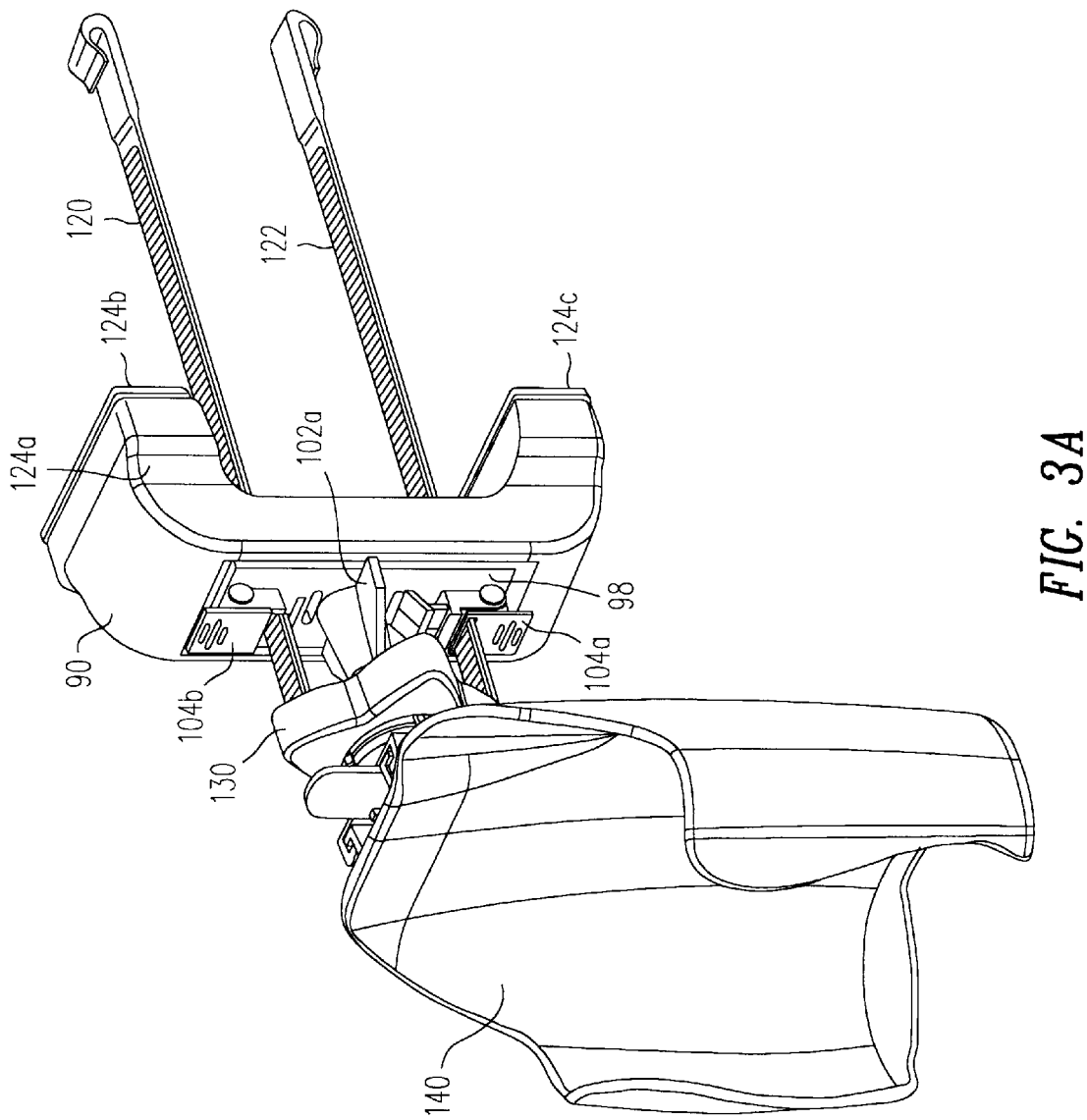
FIGS. 3A, 3B show respectively an assembled view of all portions of the embodiment of FIGS. 2A, 2B, and a disassembled view of same.
Figure 3B:
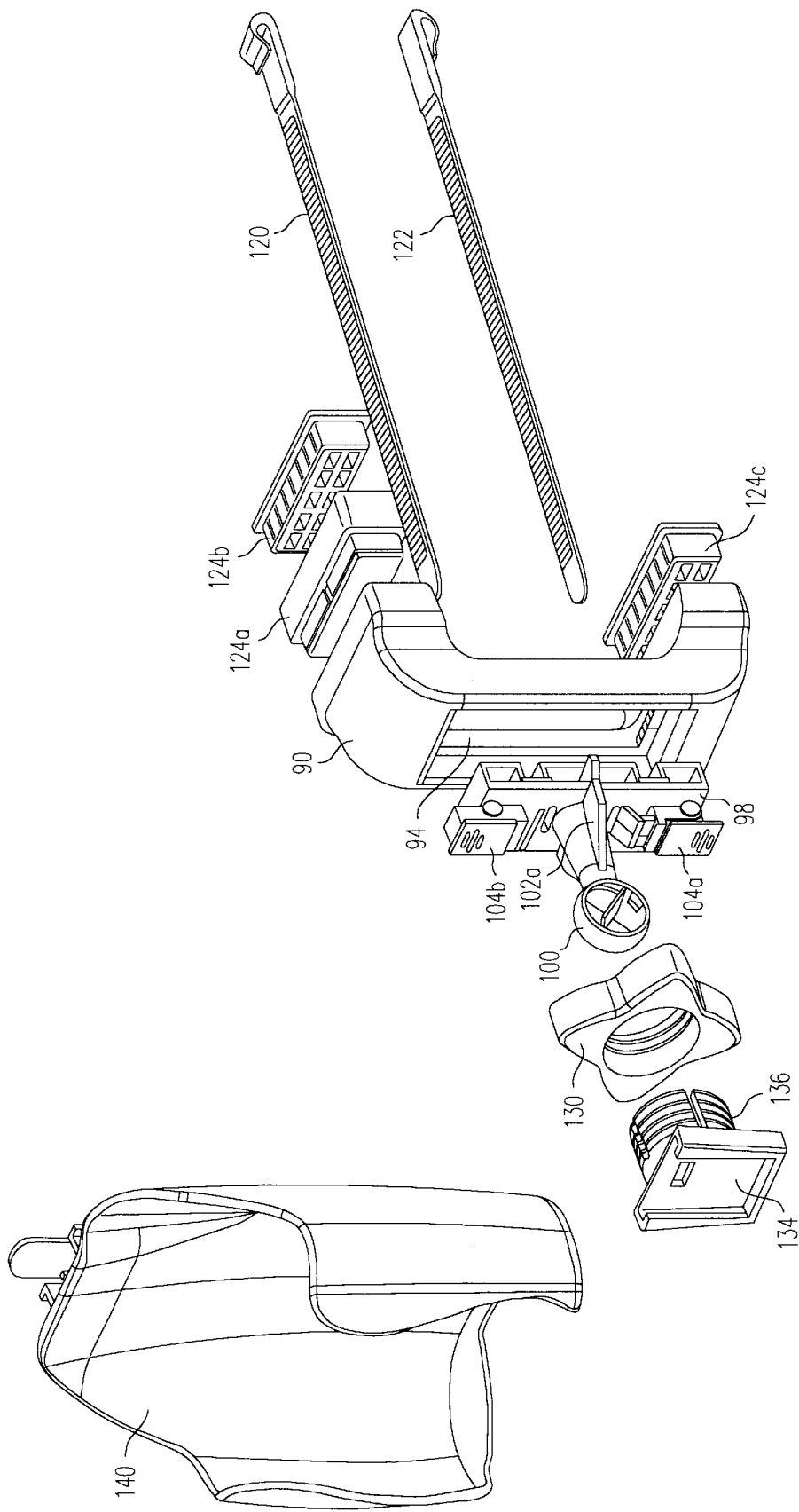

FIGS. 3A and 3B show respectively an assembled and disassembled view of the embodiment of FIG. 3A including additional elements. Note that the FIGS. 3A and 3B views also illustrate some slight variations of the structures of FIGS. 2A and 2B in terms of nonessential detail.

FIG. 3A shows a number of elements identical to those of FIGS. 2A and 2B, and additionally shows the two tie straps 120 and 122 (corresponding to tie straps 30 and 32 in FIG. 1). Also shown in FIG. 3A are the feet modular extensions 124A, 124B and 124C assembled on bracket 90. Also shown is the lock ring 130 which in this case is not round. Attached to the ball of the ball and socket is the holster 140. This attachment is similar to that shown in FIG. 1. The holster 140 is shown in a slightly different configuration than holster 70 in FIG. 1 but its function is the same. The FIG. 3A structures are better understood in the disassembled view of FIG. 3B which additionally shows the socket 136 of the ball and socket and the attached bayonet mount 134 (which corresponds to element 62 in FIG. 1). It is to be understood that the holster 140 has mounted on its backside (not visible) a bayonet extension which fits into the bayonet socket 134.

This disclosure is illustrative and not limiting. For instance, variations in materials, dimensions, shapes, etc. to accommodate various applications are readily apparent. Further modifications will be apparent to one skilled in the art in light of this disclosure and are intended to fall within the scope of this invention.

We claim:

1. An apparatus suitable for mounting to a vent grill of a vehicle having a plurality of vent ribs, the apparatus comprising:

a first member having two feet adapted to contact a dashboard of the vehicle adjacent the vent grill;

a second member adapted to at least partly fit inside a cavity defined in the first member, the cavity being defined in a surface of the first member opposing the feet, the second member including one element of a ball and socket, wherein the second member defines two spaced apart slots;

a first hook member and a second hook member, each hook member being flexible and terminating in a hook adapted to hook around one of the vent ribs, wherein each hook member includes an extension portion extending away from the hooks, the extension portion including a plurality of teeth, whereby the extension portion respectively fits into one of the slots and the teeth ratchedly engage the slot so that a length of the extension portion extending from the slot is adjustable.

2. The apparatus of claim 1, wherein the hooks of the hook members, when the respective hook members are engaged in the respective slots, each extend away from one another and hook respectively on different vent ribs.

3. The apparatus of claim 1, wherein the extension portion of each hook member is adjustable in its respective slot independent of the other hook member.

4. The apparatus of claim 1, wherein the feet are length adjustable.

5. The apparatus of claim 1, wherein the cavity in the first member defines a plurality of detents to accommodate corresponding lugs on the second member, thereby allowing the second member to be located at one of a plurality of positions in the cavity.

6. The apparatus of claim 1, further comprising the other element of the ball and socket, and a container portion coupled to the other member, whereby the container portion is adapted to hold a portable electrical device.

7. The apparatus of claim 1, further comprising a spring loaded member mounted on the second member adjacent each slot, thereby to engage the extension portion of the respective hook member.

8. The apparatus of claim 7, wherein each spring loaded member is disengageable by finger pressure, thereby to disengage the hook member from its respective slot.

9. The apparatus of claim 1, wherein a portion of the second member is adapted to fit over the cavity, wherein the ends of the second member extend past side edges of the first member.

10. The apparatus of claim 1, further comprising modularized pads on the feet of the first member for bearing against the dashboard.

11. The apparatus of claim 1, wherein the second member defines two additional slots for accommodating respectively an end of each of the hook members that extends out of the slots.

* * * * *